(12) United States Patent
Shogaki (10) Patent No.: US 9,432,553 B2
(45) Date of Patent: Aug. 30, 2016

(54) IMAGE PROCESSING APPARATUS, COMMUNICATION SYSTEM, INFORMATION PROCESSING METHOD, AND STORAGE MEDIUM

(71) Applicant: CANON KABUSHIKI KAISHA, Tokyo (JP)

(72) Inventor: Yohei Shogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/684,141

(22) Filed: Apr. 10, 2015

(65) Prior Publication Data

US 2015/0296100 A1     Oct. 15, 2015

(30) Foreign Application Priority Data

Apr. 14, 2014  (JP) .................................. 2014-082897

(51) Int. Cl.
*G06K 15/00* (2006.01)
*H04N 1/44* (2006.01)
*H04N 1/00* (2006.01)

(52) U.S. Cl.
CPC ........ *H04N 1/4433* (2013.01); *H04N 1/00302* (2013.01); *H04N 1/00408* (2013.01); *H04N 1/00962* (2013.01); *H04N 1/4413* (2013.01); *H04N 2201/0094* (2013.01)

(58) Field of Classification Search
USPC ............. 358/1.14, 1.15, 1.13; 455/41.1, 41.2
See application file for complete search history.

(56) References Cited

U.S. PATENT DOCUMENTS

| 8,185,474 | B2 * | 5/2012 | Teramoto | G06F 21/608 705/54 |
|---|---|---|---|---|
| 2009/0093727 | A1 * | 4/2009 | Sato | A61B 5/117 600/476 |
| 2011/0231902 | A1 * | 9/2011 | Nagasaki | H04L 1/0806 726/3 |
| 2012/0250059 | A1 * | 10/2012 | Itogawa | G06F 3/1204 358/1.13 |
| 2013/0231047 | A1 * | 9/2013 | Ogawa | H04B 5/0031 455/41.1 |
| 2014/0168687 | A1 * | 6/2014 | Kim | H04N 1/00342 358/1.14 |
| 2015/0326752 | A1 * | 11/2015 | Hayasaki | H04N 1/4074 358/522 |

FOREIGN PATENT DOCUMENTS

JP     2010-146485 A     7/2010

\* cited by examiner

*Primary Examiner* — Jerome Grant, II
(74) *Attorney, Agent, or Firm* — Canon USA, Inc. I.P. Division (57) ABSTRACT

An image processing apparatus includes a reception unit that receives a login request from a wireless terminal apparatus and an execution unit that executes different login processing according to whether the wireless terminal apparatus from which the login request was received has a display.

11 Claims, 7 Drawing Sheets

IMAGE PROCESSING APPARATUS, COMMUNICATION SYSTEM, INFORMATION PROCESSING METHOD, AND STORAGE MEDIUM

BACKGROUND

1. Field

Aspects of the present invention generally relate to an image processing apparatus, a communication system, an information processing method, and a storage medium, which are related to login processing.

2. Description of the Related Art

There is considered a system in which authentication processing is performed via an image processing apparatus having an authentication function, and authentication processing is performed from a plurality of locations, such as external terminals connected to the image processing apparatus via a network. When authentication processing is performed by using the image processing apparatus in such a system, it is assumed that, while a first user logs in, a second user logs in to the image processing unit to interrupt processing.

Japanese Patent Application Laid-Open No. 2010-146485 discusses an image processing apparatus which permits interruption processing. More specifically, while a first user is printing, when the image processing apparatus receives an authentication request of a second user different from the first user currently printing, the image processing apparatus receives again an authentication request of the first user currently printing and permits the second user to perform printing as interruption processing.

In the image processing apparatus discussed in Japanese Patent Application Laid-Open No. 2010-146485, when authentication processing is performed by using the image processing apparatus, an interrupted user is unable to perform operations on a user input unit of the image processing apparatus until processing of an interrupting user is completed, resulting in poor user-friendliness.

SUMMARY

Aspects of the present invention are generally directed to improving user-friendliness related to login processing.

According to an aspect of the present invention, an image processing apparatus includes a reception unit configured to receive a login request from a wireless terminal apparatus and an execution unit configured to execute different login processing according to whether the wireless terminal apparatus from which the login request was received has a display.

Further features of the present disclosure will become apparent from the following description of exemplary embodiments with reference to the attached drawings.

DESCRIPTION OF THE EMBODIMENTS

Exemplary embodiments will be described below with reference to the accompanying drawings.

Figure 1:
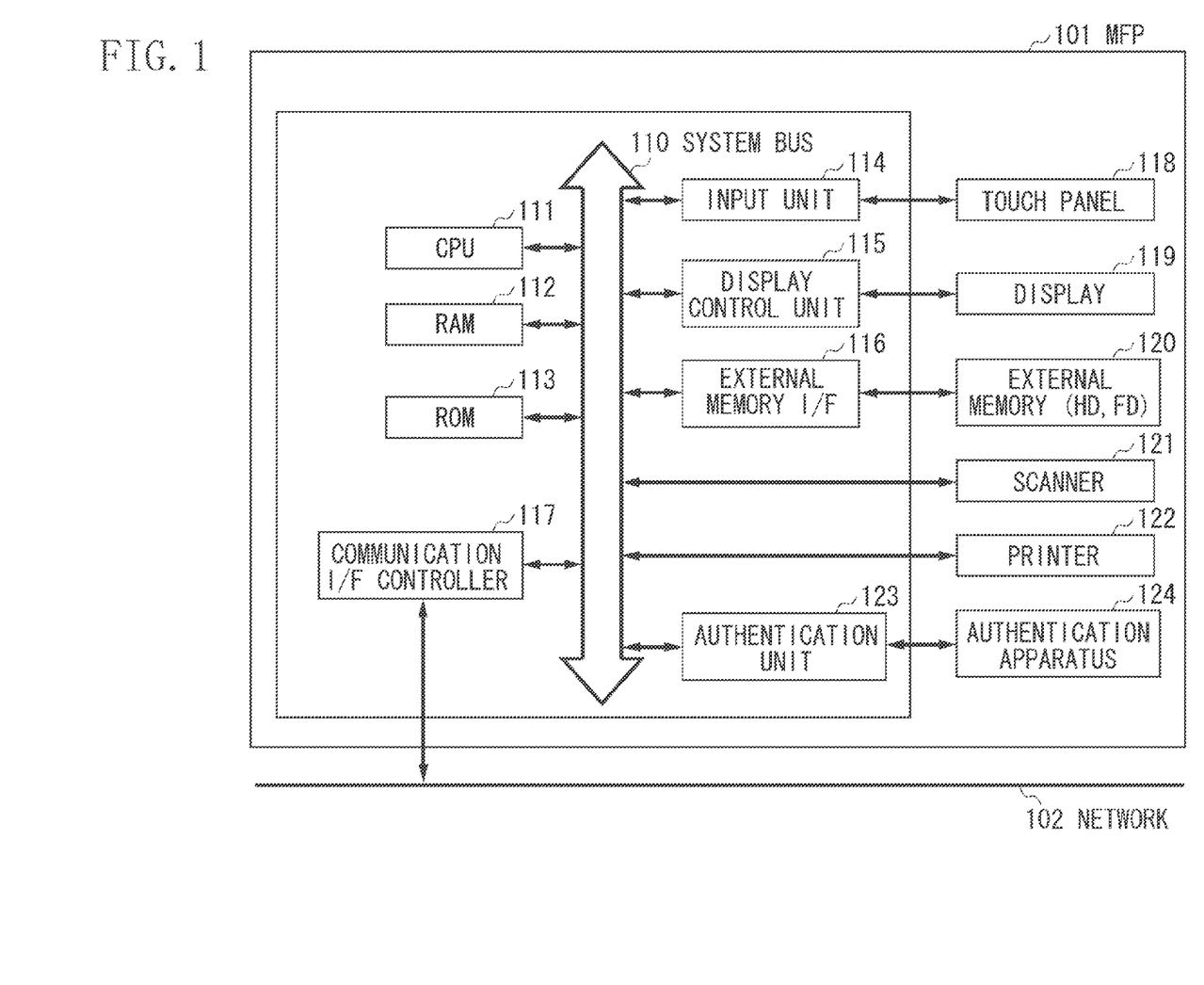
FIG. 1 illustrates an example of a hardware configuration of an image processing apparatus.

FIG. 1 illustrates an example of a hardware configuration of an image processing apparatus. FIG. 1 illustrates a multifunction peripheral (MFP) as an example of an image processing apparatus. An MFP 101 includes a central processing unit (CPU) 111, a scanner 121, and a printer 122. The CPU 111, a random access memory (RAM) 112, a read only memory (ROM) 113, an input unit 114, a display control unit 115, an external memory interface (I/F) 116, and a communication I/F controller 117 are connected to a system bus 110. A touch panel 118, a display 119, and an external memory 120 are connected to the system bus 110. These processing units are configured to exchange data with each other via the system bus 110.

The ROM 113, a nonvolatile memory, stores image and other data and various programs required for operations of the CPU 111 in respective predetermined areas. The RAM 112, a volatile memory, is used as a main memory for the CPU 111 and as a temporary storage area such as a work area. For example, according to a program stored in the ROM 113, the CPU 111 performs processing by using the RAM 112 as a work memory to control each unit of the MFP 101. The programs required for operations of the CPU 111 may be stored not only in the ROM 113 but also in the external memory (such as a hard disk) 120. When the CPU 111 performs processing according to a program, the software configuration of the MFP 101 and processing of flowcharts (described below) are implemented.

The input unit 114 receives a user operation, generates a control signal in response to the operation, and supplies the control signal to the CPU 111. For example, the input unit 114 receives a user operation from the touch panel 118 which functions as an input device. The touch panel 118 is, for example, an input device configured to output coordinates information corresponding to a touched position to the flatly formed input unit 114. Based on a control signal generated and supplied by the input unit 114 in response to the user operation performed on the input device, the CPU 111 controls each unit of the MFP 101 according to a program. Thus, the MFP 101 is able to perform an operation in response to the user operation. The display control unit 115 outputs a display signal for displaying an image on the display 119. For example, the CPU 111 supplies a generated display control signal to the display control unit 115 according to the program. The display control unit 115 generates a display signal based on the display control signal, and outputs the display signal to the display 119. For example, based on the display control signal generated by the CPU 111, the display control unit 115 displays on the display 119 a graphical user interface (GUI) screen for configuring a GUI.

The touch panel 118 is integrally configured with the display 119, and functions also as a display. For example, a manufacturer configures the touch panel 118 so that the transmissivity of light does not disturb a display content of the display 119, and attaches the touch panel 118 to the upper layer of the display surface of the display 119. Then, the manufacturer associates input coordinates on the touch panel 118 with display coordinates on the display 119. Thus, a GUI is configured to allow a user to directly operate the screen displayed on the display 119.

Any one of diverse types of the touch panel 118 can be used, for example, a resistance film type, a capacitance type, a surface elastic wave type, an infrared type, an electromagnetic induction type, an image recognition type, and an optical sensor type.

The external memory 120, such as a hard disk, a flexible disk, a compact disc (CD), a digital versatile disc (DVD), or a memory card is attachable to the external memory I/F 116. The external memory I/F 116 writes and reads data to/from the external memory 120 under the control of the CPU 111. The communication I/F controller 117 communicates with a network 102, such as a local area network (LAN), the Internet, a wired network, and a wireless network, under the control of the CPU 111. Various apparatuses including a personal computer (PC) 402, other MFPs, printers, servers, etc. are connected to the network 102 so that they can communicate with the MFP 101.

The scanner 121 reads a document to generate image data. The printer 122 performs print processing based on a user's instruction input via the input unit 114 or a command input from an external apparatus via the communication I/F controller 117.

An authentication unit 123 performs authentication processing. For example, according to a program, the CPU 111 performs communication via an authentication apparatus 124 to perform authentication based on authentication information. The authentication apparatus 124 refers to, for example, an integrated circuit (IC) card authentication server and an apparatus having a short-range wireless communication function typified by Near Field Communication (NFC).

The MFP 101 is able to store image data in the RAM 112 or the external memory 120 by using at least one storage method. For example, the MFP 101 stores image data generated from a document read by the scanner 121. Alternatively, the MFP 101 stores image data received from an external apparatus, such as a PC connected on the network 102, via the communication I/F controller 117. Alternatively, the MFP 101 stores image data received from a portable storage medium (a universal serial bus (USB) memory or a memory card) attached to the external memory I/F 116. In addition, the MFP 101 may store image data in the external memory 120 by using another storage method.

Figure 2:
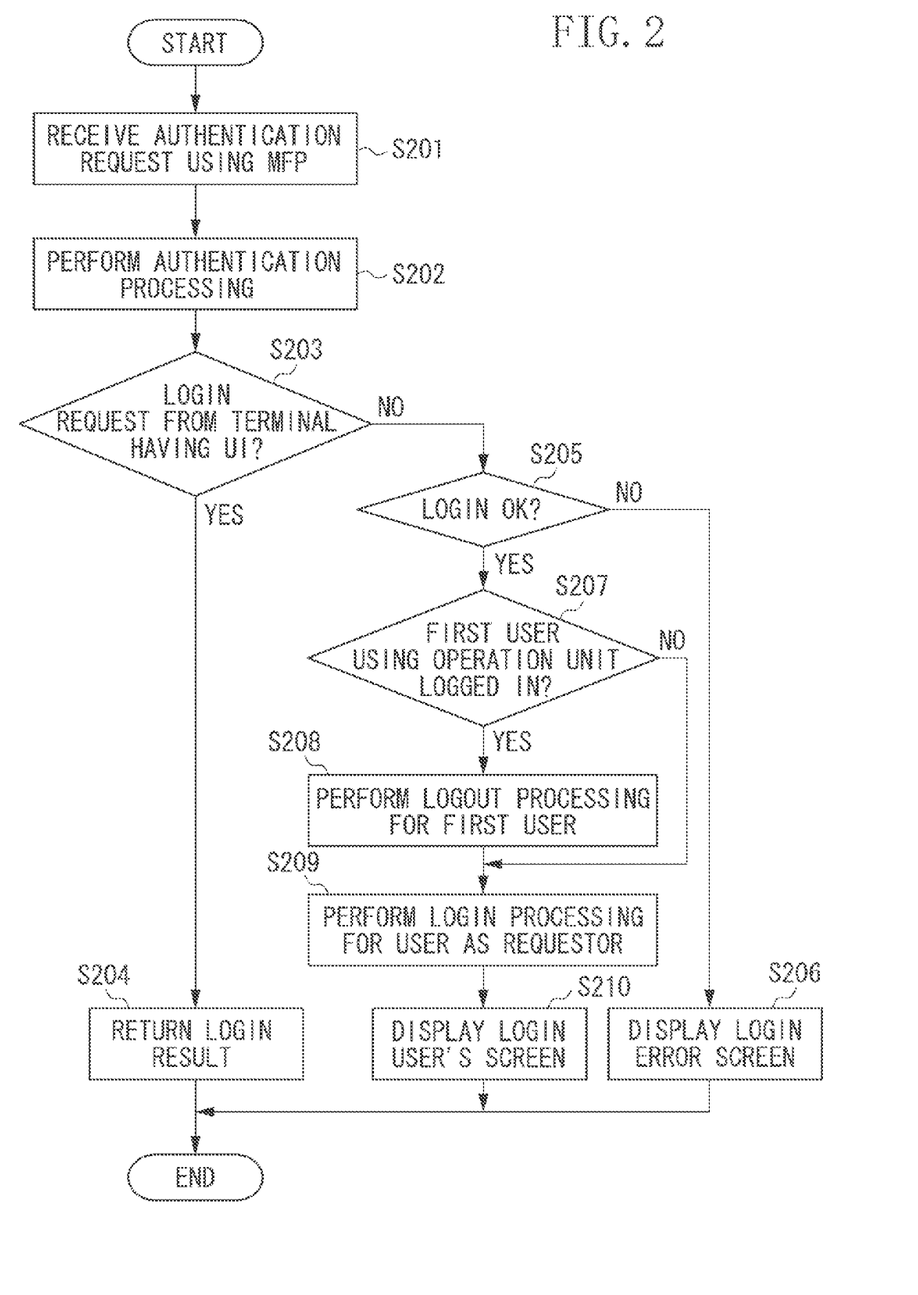
FIG. 2 is a flowchart illustrating an example of information processing related to login.
Figure 3:
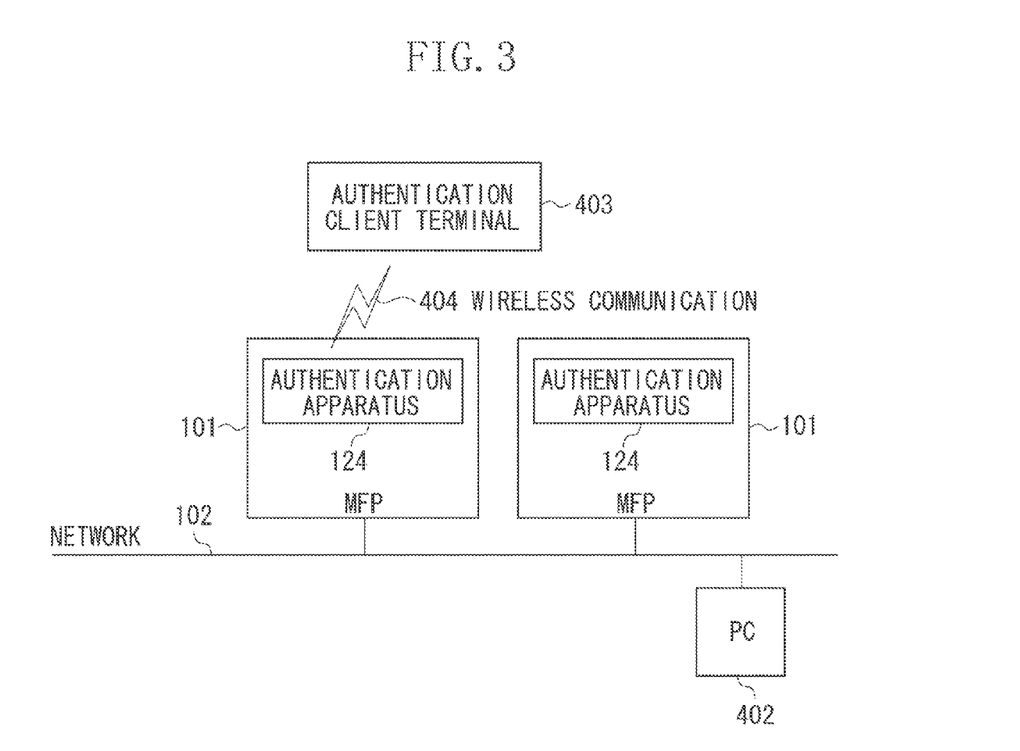
FIG. 3 illustrates an example of a system configuration of a communication system.

The following describes in detail a series of information processing for logging in via the authentication function of the MFP 101 with reference to a flowchart illustrated in FIG. 2 and a system configuration of a communication system illustrated in FIG. 3. An authentication client terminal 403 illustrated in FIG. 3 includes at least a CPU, a memory, and a display as a hardware configuration. The CPU performs processing according to a program stored in the memory to implement functions of the authentication client terminal 403. The authentication client terminal 403 is an example of a wireless terminal apparatus.

In step S201, the CPU 111 receives an authentication request using the MFP 101. The CPU 111 is able to receive an authentication request from the screen displayed on the display 119 and an authentication request using the authentication apparatus 124 connected to the MFP 101. The CPU 111 acquires, for example, individual authentication information (a user identifier (ID) and a password) input from the screen on the display 119, and receives an authentication request. The authentication client terminal 403 serves as a requestor of an authentication request. Examples of the authentication client terminal 403 include an NFC-mounted electronic device typified by a cellular phone, and an IC card. An NFC-mounted terminal is or is not provided with a display. When an IC card is used as the authentication client terminal 403, the authentication apparatus 124 detects that the IC card is brought close to it, reads individual authentication information from the IC card, and receives an authentication request. When an NFC-mounted terminal is used as the authentication client terminal 403, the authentication apparatus 124 detects that the NFC-mounted terminal is brought close to it, reads individual authentication information from the NFC-mounted terminal, and receives an authentication request. The authentication client terminal 403 and the MFP 101 communicate with each other via short-range wireless communication.

The authentication client terminal 403 may be of any type as long as it is an authentication terminal having an authentication function, such as authentication using a fingerprint or a finger vein.

In addition, although the MFP 101 is able to receive an authentication request from the PC 402 connected via the network 102, this request is not regarded as an authentication request using the MFP 101.

In step S202, the CPU 111 performs authentication processing by using the acquired individual authentication information. The CPU 111 performs authentication processing on the above-described individual authentication information based on an authentication table stored in the memory. The CPU 111 determines whether to permit login, reject login, or permit restricted login based on the individual authentication information. In restricted login permission, for example, although the CPU 111 permits the use of the scanner 121, the CPU 111 permits the use of the printer 122 on a restricted basis, i.e., permits the use of not all functions.

The CPU 111 may perform authentication processing by using another means other than the authentication table. For example, in a configuration in which a plurality of persons is able to login in parallel, the CPU 111 may determine to permit login depending on the number of persons simultaneously logging in. When the number of persons simultaneously logging in becomes larger than a predetermined threshold value, the CPU 111 determines to reject login.

The CPU 111 may determine to permit login depending on authority of a user who is attempting to log in. The CPU 111 reads authority of the user from the user ID included in the above-described acquired individual authentication information, and compares the read authority of the user with authority of the user in a user authority table stored in the memory. When the user has the authority of the user higher than the predetermined authority, the CPU 111 determines to permit login.

The CPU 111 may determine to permit login based on setting information predetermined before performing authentication processing. For example, an administrator presets to the MFP 101 setting information for giving login permission only to specific users from an administrator setting screen. Then, the CPU 111 gives login permission only to a user who is a specific user. For another example, when the CPU 111 receives an authentication request from a user, the CPU 111 may display options on the display 119, and, according to a result of the user's selection, determine whether the user is a specific user permitted by the administrator set in the setting information.

When the CPU 111 performs authentication processing, the CPU 111 may determine to permit login according to whether the scanner 121 or the printer 122 of the MFP 101 is currently operating. For example, when the CPU 111 determines that the printer 122 is currently operating, the CPU 111 may determine to reject login.

Moreover, the CPU 111 may perform a combination of the above-described authentication processing methods.

In step S203, the CPU 111 determines whether an authentication request (or a login request) was received by using an authentication terminal having a display. When the CPU 111 determines that the authentication client terminal 403 is an authentication terminal having a display (YES in step S203), the processing proceeds to step S204. On the other hand, when the CPU 111 determines that the authentication client terminal 403 is a terminal having no display (NO in step S203), the processing proceeds to step S205.

For example, information about whether the authentication client terminal 403 has a display is included in information exchanged in the process of communication with the authentication client terminal 403 via the authentication apparatus 124 in step S201. Based on the above-described information, for example, the CPU 111 determines whether the authentication client terminal 403 is an authentication terminal having a display.

The CPU 111 may determine whether the authentication client terminal 403 has a display by using other methods. For example, the CPU 111 reads identification information of the authentication client terminal 403 from among pieces of information exchanged in the process of communication. Then, the CPU 111 may determine whether the authentication client terminal 403 has a display according to whether the read identification information agrees with a certain predetermined condition. For example, in the case of the authentication client terminal 403 having a display, when the first character of the identification information is an alphabetic character, the CPU 111 determines whether the authentication client terminal 403 has a display according to whether the first character of the identification information is an alphabetic character.

When the MFP 101 is provided with both a card reader apparatus and an NFC apparatus as the authentication apparatus 124, the CPU 111 may determine whether the authentication client terminal 403 has a display according to which apparatus an authentication request was received through. In this case, when the CPU 111 has received the authentication request through communication via the card reader apparatus, the CPU 111 determines that the authentication client terminal 403 has no display. On the other hand, when the CPU 111 has received the authentication request through communication via the NFC apparatus, the CPU 111 determines that the authentication client terminal 403 has a display.

When the CPU 111 receives the authentication request, the CPU 111 may transmit a request to the authentication client terminal 403 and, according to a response to the above-described request, determine whether the authentication client terminal 403 has a display. For example, the CPU 111 transmits to the authentication client terminal 403 a request for checking whether it has a display. If the CPU 111 receives from the authentication client terminal 403 a response indicating that it has a display in response to the above-described check request, the CPU 111 determines that the authentication client terminal 403 has a display. On the other hand, if the CPU 111 does not receive a response from the authentication client terminal 403 within a predetermined time period or receives a response indicating that it has no display, the CPU 111 determines that the authentication client terminal 403 has no display.

When performing communication between the MFP 101 and the authentication client terminal 403 via wireless communication 404, if the MFP 101 is able to acquire predetermined information from the authentication client terminal 403, the CPU 111 may determine that the authentication client terminal 403 has a display. On the other hand, if the MFP 101 is unable to acquire the predetermined information, the CPU 111 may determine that the authentication client terminal 403 has no display.

Further, the CPU 111 may determine a branch target of the processing in step S203 according to a setting. For example, if the MFP 101 is set to accept only the authentication client terminal 403 having a display, the processing proceeds to step S204. If the MFP 101 is set otherwise, the processing may proceed to step S205.

Furthermore, the CPU 111 may determine whether the authentication client terminal 403 is a terminal having a display based on the user ID and the password included in the authentication request received from the authentication client terminal 403.

Figure 4:
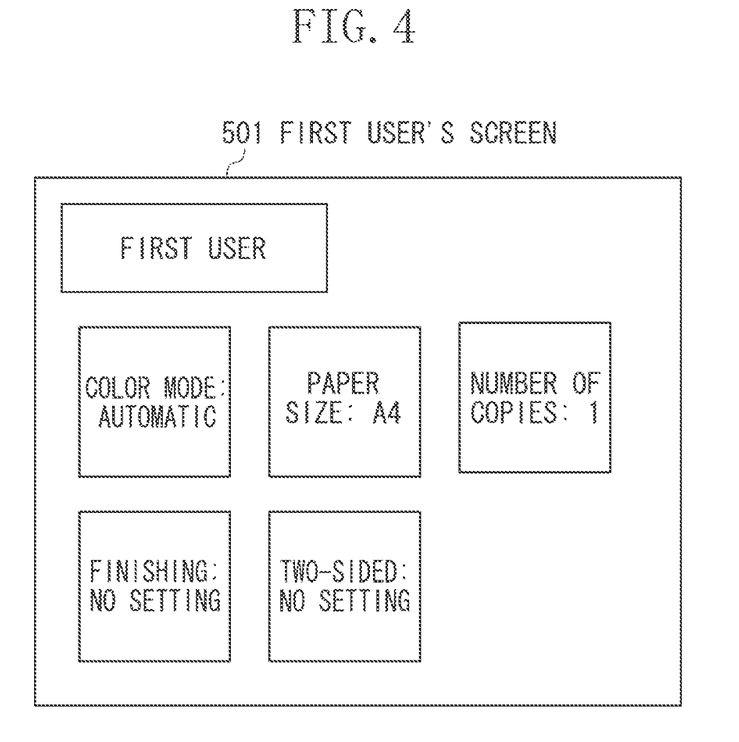
FIG. 4 illustrates an example of a screen for a first user.

In step S204, the CPU 111 returns a result (login result) of authentication processing performed in step S202 to the authentication client terminal 403 via the authentication apparatus 124. Even if the CPU 111 determines to permit login, the CPU 111 does not change the entire screen of the display 119 to a screen for a user who was permitted to login. The CPU 111 maintains the display of a screen 501 to be used by a first user illustrated in FIG. 4 on the display 119. However, the CPU 111 may change a part of the screen of the display 119 to a display indicating that there is a user who was permitted to login. This enables the user currently operating the display 119 to know that there is a user who was permitted to login.

The authentication client terminal 403 issues an authentication request, receives an authentication result, and performs a series of processing. Detailed descriptions of the processing will be omitted in the flowchart illustrated in FIG. 2. Since the authentication client terminal 403 has a display, the CPU of the authentication client terminal 403 changes a display content of the display depending on the authentication result. If the authentication result is login permission, the CPU of the authentication client terminal 403 changes the display content of the display to a screen for enabling the user to request the MFP 101 to perform scanning and printing. If the authentication result is login rejection, the CPU of the authentication client terminal 403 changes the display content of the display to an error screen to notify the user that login was rejected. If the authentication result is restricted login permission, the CPU of the authentication client terminal 403 changes the display content of the display to a screen for enabling the user to request the MFP 101 to perform scanning and printing with some functions restricted to be used.

In step S205, the CPU 111 determines the result of authentication processing, i.e., whether login was permitted or rejected. When login was rejected as a result of authentication processing performed in step S202 (NO in step S205), the processing proceeds to step S206. On the other hand, when login was not rejected (YES in step S205), the processing proceeds to step S207.

Figure 5:
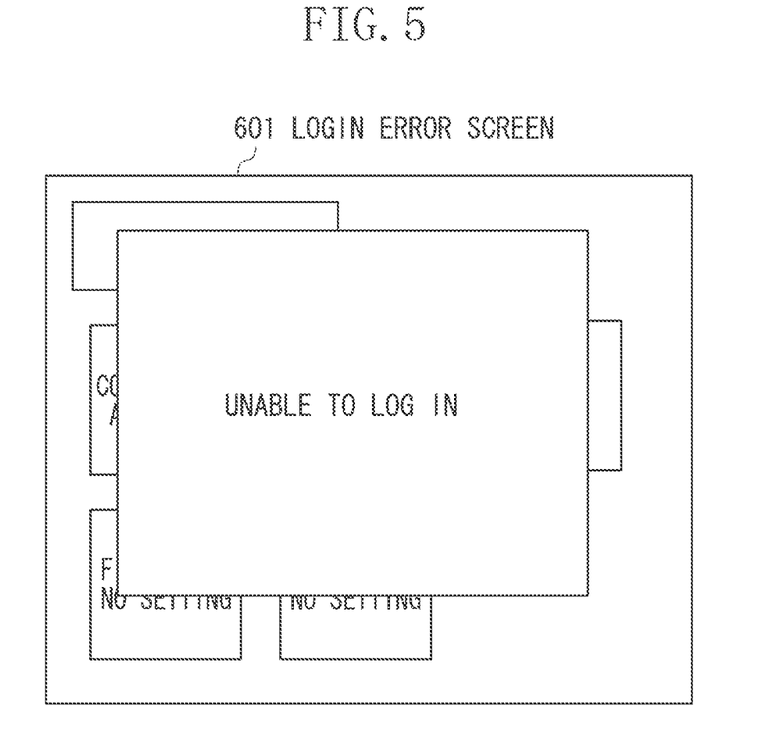
FIG. 5 illustrates an example of a login error screen.

In step S206, upon reception of the authentication result indicating login rejection, the CPU 111 displays on the display 119 a login error screen 601 illustrated in FIG. 5 to notify the user that login was rejected.

In step S207, the CPU 111 determines whether there is a first user who logged in from the screen displayed on the display 119 of the MFP 101. In other words, the CPU 111 determines whether there is a first user currently using the display 119 of the MFP 101. When the CPU 111 determines that there is a first user currently using the display 119 (YES in step S207), the processing proceeds to step S208. On the other hand, when the CPU 111 determines that there is not a first user currently using the display 119 (NO in step S207), the processing proceeds to step S209.

In step S208, the CPU 111 performs logout processing for the above-described first user. During logout processing for the first user, the CPU 111 associates screen information of the screen currently displayed on the display 119 with the first user, and stores the screen information in a storage area such as the RAM 112. When a second user logs out and then the first user logs in again, the CPU 111 reads the above-described screen information and reflects it to the screen on the display 119.

In step S209, the CPU 111 performs login processing for the second user who is an authentication requestor.

When the second user logs in, since logout processing for the first user is not mandatory, the CPU 111 may perform login processing for the second user while maintaining the login state of the first user.

Figure 6:
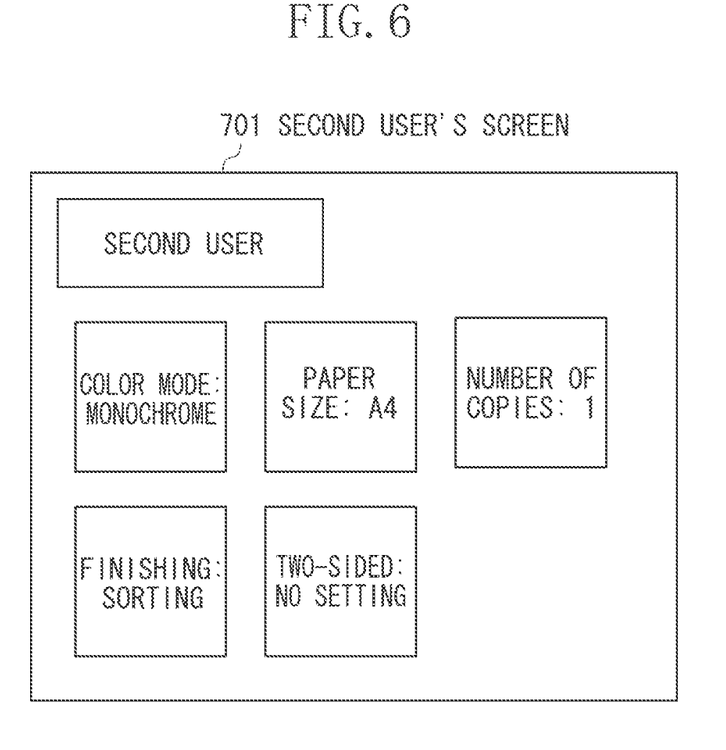
FIG. 6 illustrates an example of a screen for a second user.

In step S210, the CPU 111 displays on the display 119 a screen 701 to be used by the second user who is an authentication requestor illustrated in FIG. 6.

As described above, according to the present exemplary embodiment, it is possible to login without changing the screen of the display 119 of the MFP 101. Conventionally, there has been two different situations: a situation where authentication processing is performed from the PC 402 connected via the network 102, and a situation where authentication processing is performed via the MFP 101. When authentication processing was to be performed via the MFP 101, the screen of the display 119 of the MFP 101 was changed to a screen for a user who logged in. In contrast, if a terminal having a display other than the display 119 of the MFP 101 is used, even when an authentication request is received via the MFP 101, the MFP 101 is able to perform authentication processing without changing the screen of the display 119. As a result, a user who attempts to use the display 119 of the MFP 101 does not exclusively use the display 119, and a user having been using the display 119 is able to successively use it, thus improving user-friendliness.

Further, the MFP 101 switches processing between the authentication client terminal 403 having a display and the authentication client terminal 403 having no display. Accordingly, the MFP 101 does not need to limit a plurality of the authentication client terminals 403 to one type.

When the CPU 111 receives an authentication request from the authentication client terminal 403 having no display, a user who is an authentication requestor determines to perform an operation using the display 119 of the MFP 101. Since the MFP 101 has a single display 119, only one user is able to use the display 119 at one time. Therefore, when there is already a first user currently using the display 119 of the MFP 101 and when an authentication request is received from a second user determined to perform an operation using the display 119 of the MFP 101, the CPU 111 performs logout processing for the first user. Then, when the CPU 111 performs login processing for the second user, the second user is able to use the display 119 of the MFP 101.

If a result of restricted login permission is provided for authentication processing, the authentication client terminal 403 having a display, which obtained a response of restricted login permission, is able to provide the user with a highly user-friendly display. Switching the display content of the display of the authentication client terminal 403 depending on restrictions enables providing the user with a screen with limited operations according to the status of the MFP 101.

Figure 7:
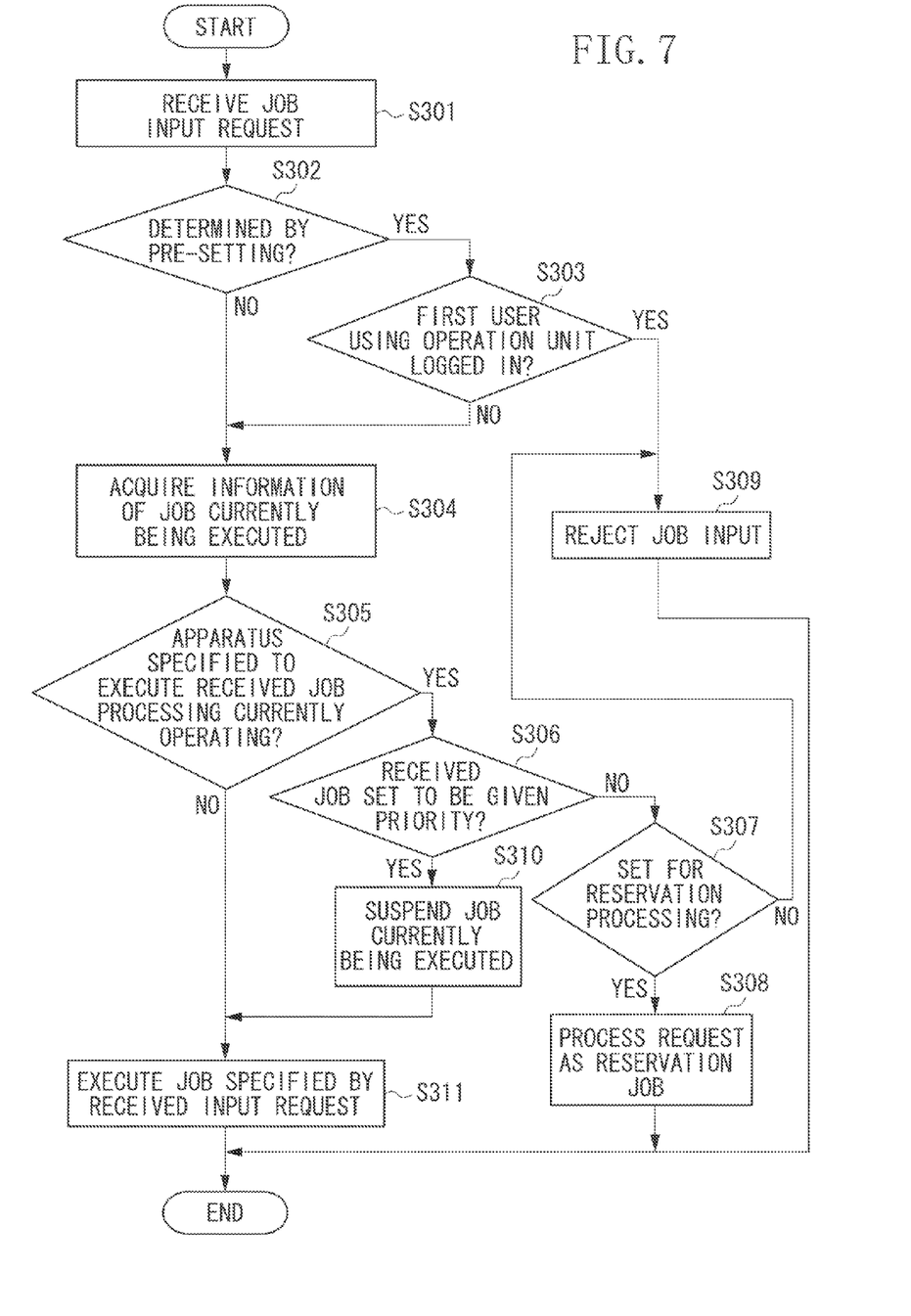
FIG. 7 is a flowchart illustrating an example of information processing related to job execution.

The following describes in detail a series of processing for executing a processing instruction received by the MFP 101, with reference to a flowchart illustrated in FIG. 7.

In step S301, the CPU 111 receives a processing instruction execution request (or a job input request) via the MFP 101. Processing instructions executable by the MFP 101 include instructions for print processing, image data generation processing, facsimile transmission processing, and box store processing. The above-described processing instructions are used by the CPU 111 to instruct the scanner 121 to perform image data generation processing and to instruct the printer 122 to perform print processing.

In step S302, the CPU 111 determines whether a processing method is to be determined by a pre-setting. The CPU 111 determines whether to make prior determination based on another condition before switching the processing depending on the status of an apparatus currently operating (described below). When the CPU 111 determines that CPU 111 makes prior determination based on another condition depending on the status of the apparatus (YES in step S302), the processing proceeds to step S303. On the other hand, when the CPU 111 determines not to make prior determination based on another condition (NO in step S302), the processing proceeds to step S304.

In step S303, the CPU 111 determines whether there is a first user who logged in from the screen displayed on the display 119 of the MFP 101. In other words, the CPU 111 determines whether there is a first user currently using the display 119 of the MFP 101. When the CPU 111 determines that there is a first user currently using the display 119 (YES in step S303), the processing proceeds to step S309. On the other hand, when the CPU 111 determines that there is not a first user currently using the display 119 (NO in step S303), the processing proceeds to step S304.

When there is the first user currently using the MFP 101, the second user is allowed only to make setting and prevented from executing the processing instruction. Thus, processing for the first user can be constantly given priority.

Although the CPU 111 determines to constantly give priority to processing for the first user according to whether there is the first user currently using the display 119 of the MFP 101, the determination may be based on other conditions. For example, the CPU 111 compares authority of the first user with authority of the second user, and, when the authority of the first user is set to be higher than the authority of the second user, the CPU 111 may determine to constantly give priority to processing for the first user. Alternatively, at the time of login processing, the CPU 111 receives from the first or second user in advance setting information about whether priority is to be constantly given to processing for the first user. Then, the CPU 111 may determine whether to constantly give priority to processing for the first user depending on the setting information.

The processing in step S303 is not mandatory for the present exemplary embodiment. The processing in step S303 may be omitted, and the processing in step S304 may be constantly executed.

In step S304, upon reception of a processing instruction, the CPU 111 acquires information about the processing currently being executed. To determine a processing method for the received execution request, the CPU 111 acquires information about whether various apparatuses such as the scanner 121 and the printer 122 are currently operating.

In step S305, the CPU 111 determines whether the apparatus specified to execute the received processing instruction is currently operating. When the received processing instruction is an execution request including print processing, the CPU 111 determines whether the printer 122, an apparatus specified to execute print processing, is currently operating. When the received processing instruction is an execution request including image data generation processing, the CPU 111 determines whether the scanner 121, an apparatus specified to execute image data generation processing, is currently operating. When the apparatus specified to execute the received processing instruction is not currently operating (NO in step S305), the processing proceeds to step S311. On the other hand, when the apparatus specified to execute the received processing instruction is currently operating (YES in step S305), the processing proceeds to step S306.

In step S306, the CPU 111 determines which of the processing currently being executed and the processing specified by the received processing instruction is to be given priority. For example, the CPU 111 compares the authority of the first user who instructed the processing currently being executed with the authority of the second user, a requestor of the processing instruction, to make the above-described determination according to whether the second user's authority is set to be higher than the first user's authority. When the CPU 111 determines to give priority to the processing specified by the received processing instruction (YES in step S306), the processing proceeds to step S310. On the other hand, when the CPU 111 determines to give priority to the processing currently being executed (NO in step S306), the processing proceeds to step S307.

In step S307, the CPU 111 determines whether the processing specified by the received processing instruction execution request is to be executed after completion of the processing currently being executed. The CPU 111 reads preset setting information from a storage area such as the RAM 112. The setting information includes information about whether the processing instruction is to be handled as reservation processing or the processing instruction is to be rejected. When the CPU 111 determines to perform the relevant processing after completion of the processing currently being executed (YES in step S307), the processing proceeds to step S308. On the other hand, when the CPU 111 determines not to perform the relevant processing after completion of the processing currently being executed (NO in step S307), the processing proceeds to step S309.

In step S308, the CPU 111 reserves the processing specified by the received processing instruction execution request so as to be performed after completion of the processing currently being executed. The reserved processing will be executed after completion of the current processing and the apparatus specified to execute the relevant processing enters a standby state.

In step S309, the CPU 111 rejects the processing instruction execution request. Then, the CPU 111 notifies the processing requestor that the processing was rejected. If the authentication client terminal 403 having a display is a processing requestor, the display of the authentication client terminal 403 displays that the relevant processing was rejected. Otherwise, the display 119 of the MFP 101 displays that the relevant processing was rejected.

In step S310, the CPU 111 temporarily suspends the processing currently being executed. The CPU 111 associates the contents of the suspended processing with the second user, and stores the contents in a storage area such as the RAM 112. When processing for the second user is completed and processing for the first user is performed again, the CPU 111 reads the above-described stored processing contents.

In step S311, the CPU 111 performs the processing specified by the received processing instruction execution request. The scanner 121 and the printer 122 are able to simultaneously operate. Therefore, if the scanner 121 is operating and the printer 122 is not, the CPU 111 can execute an execution instruction for the printer 122.

Although the CPU 111 determines a processing method according to whether the apparatus specified to execute a processing instruction is currently operating, the CPU 111 may determine a processing method based on other conditions. For example, upon reception of a processing instruction, the CPU 111 may display options for selecting a processing method on the screen of the display 119 of the MFP 101. The CPU 111 displays options for specifying whether to execute the received processing instruction on the display 119, and, upon reception of a selection result from the display 119, determines a processing method. The CPU 111 may determine a processing method based on preset setting information or on attribute information included in the processing instruction.

Further, the CPU 111 may determine a processing method based on a combination of a plurality of methods.

Although the CPU 111 is described to be configured to switch processing depending on the priority of a processing instruction if the apparatus specified to execute the processing instruction is currently operating, the CPU 111 may perform other processing. For example, instead of switching based on the priority, the CPU 111 may uniformly reserve all pieces of processing so that they will be executed later.

As described above, according to the present exemplary embodiment, user-friendliness can be improved by switching processing according to whether an apparatus specified to execute a processing instruction of the MFP 101 is currently operating.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiments, user-friendliness related to login processing can be improved.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-082897 filed Apr. 14, 2014, which is hereby incorporated by reference herein in its entirety.

What is claimed is:

1. An image processing apparatus comprising:
a memory;
a processor coupled to the memory which executes the following:
receiving a login request from a wireless terminal apparatus; and
executing different login processing according to whether the wireless terminal apparatus from which the login request was received has a display,
wherein, in a case where the wireless terminal apparatus does not have the display and in a case where there is a first user having already logged in to the image processing apparatus, controlling an operation unit to change a display content of the operation unit from a screen of the first user having already logged in to the image processing apparatus to a screen of a second user who was permitted to login based on to the login request,
wherein in a case where the wireless terminal apparatus has the display, returning a result of login processing to the wireless terminal apparatus, and controlling the operation unit not to change the display content of the operation unit from the screen of the first user to the screen of the second user who was permitted to login in based on the login request even if there is the first user having already logged in to the image processing apparatus.

2. The image processing apparatus according to claim 1, wherein, in a case where the wireless terminal apparatus does not have the display, controlling the operation unit to display a login-related screen.

3. The image processing apparatus according to claim 1, wherein, in a case where the wireless terminal apparatus has a display, returning a result of login processing to the wireless terminal apparatus, and
wherein, in a case where there is the first user having already logged in to the image processing apparatus, controlling the operation unit to display information indicating that there is a user who was permitted to login on the screen of the first user currently displayed on the display of the image processing apparatus.

4. The image processing apparatus according to claim 1, wherein, in a case where the wireless terminal apparatus does not have the display and in a case where there is the first user having already logged in to the image processing apparatus, performing logout processing for the first user, permits the second user to login, and controlling the operation unit to change a display content of the operation unit from the screen of the first user having already logged in to the image processing apparatus to the screen of the second user who was permitted to login in based on the login request.

5. The image processing apparatus according to claim 1, wherein, in a case where the wireless terminal apparatus does not have the display and in a case where there is the first user having already logged in to the image processing apparatus, storing screen information of the screen of the first user in a predetermined storage area, and, when the second user logs out of the image processing apparatus, controlling the operation unit to change a display content of the operation unit to the screen of the first user based on the screen information.

6. The image processing apparatus according to claim 1, further comprising:
receiving a job; and
controlling execution of the received job according to whether a function related to execution of the received job is currently operating.

7. The image processing apparatus according to claim 6, wherein, when the function related to execution of the received job is not currently operating, executing the received job, and
wherein, when the function related to execution of the received job is currently operating, determining whether priority is to be given to execution of the received job, and
wherein, if priority is to be given to execution of the received job, suspending the job related to the function currently being executed and executes the received job.

8. The image processing apparatus according to claim 7, wherein, when the function related to execution of the received job is currently operating, determining whether priority is to be given to execution of the received job,
wherein, if priority is not to be given to execution of the received job, determining whether reservation processing is to be performed, and
wherein, if reservation processing is to be performed, performing reservation processing for the received job.

9. A communication system comprising:
an image processing apparatus; and
a wireless terminal apparatus,
wherein the image processing apparatus comprises:
a memory;
a processor coupled to the memory which executes the following:
receiving a login request from the wireless terminal apparatus; and
executing different login processing according to whether the wireless terminal apparatus from which the login request was received has a display,
wherein, in a case where the wireless terminal apparatus does not have the display and in a case where there is a first user having already logged in to the image processing apparatus, controlling an operation unit to change a display content of the operation unit from a screen of the first user having already logged in to the image processing apparatus to a screen of a second user who was permitted to login based on to the login request,
wherein in a case where the wireless terminal apparatus has the display, returning a result of login processing to the wireless terminal apparatus, and controlling the operation unit not to change the display content of the operation unit from the screen of the first user to the screen of the second user who was permitted to login in based on the login request even if there is the first user having already logged in to the image processing apparatus, and
wherein the wireless terminal apparatus comprises:
a transmission unit configured to transmit a login request to the image processing apparatus; and
a display control unit configured to, upon reception of a login result from the image processing apparatus, display a screen related to the login result.

10. An information processing method executed by an image processing apparatus, the method comprising:

receiving a login request from a wireless terminal apparatus; and executing different login processing according to whether the wireless terminal apparatus from which the login request was received has a display, wherein, in a case where the wireless terminal apparatus does not have the display and in a case where there is a first user having already logged in to the image processing apparatus, changing a display content of an operation unit from a screen of the first user having already logged in to the image processing apparatus to a screen of a second user who was permitted to login based on to the login request, wherein in a case where the wireless terminal apparatus has the display, returning a result of login processing to the wireless terminal apparatus, and controls the operation unit not to change the display content of the operation unit from the screen of the first user to the screen of the second user who was permitted to login in based on the login request even if there is the first user having already logged in to the image processing apparatus.

11. A non-transitory storage medium storing computer executable instructions for causing a computer to execute a method comprising:

receiving a login request from a wireless terminal apparatus; and executing different login processing according to whether the wireless terminal apparatus from which the login request was received has a display, wherein, in a case where the wireless terminal apparatus does not have the display and in a case where there is a first user having already logged in to the image processing apparatus, changing a display content of an operation unit from a screen of the first user having already logged in to the image processing apparatus to a screen of a second user who was permitted to login based on to the login request, wherein in a case where the wireless terminal apparatus has the display, returning a result of login processing to the wireless terminal apparatus, and controls the operation unit not to change the display content of the operation unit from the screen of the first user to the screen of the second user who was permitted to login in based on the login request even if there is the first user having already logged in to the image processing apparatus.

\* \* \* \* \*